United States Patent
Ozaki et al.

(10) Patent No.: US 9,483,923 B2
(45) Date of Patent: Nov. 1, 2016

(54) ELECTRIC TACTILE SENSE PRESENTATION DEVICE

(71) Applicant: NIPPON MEKTRON, LTD., Tokyo (JP)

(72) Inventors: Kazuyuki Ozaki, Tokyo (JP); Shingo Muromoto, Tokyo (JP); Taisuke Kimura, Tokyo (JP); Susumu Tachi, Tokyo (JP); Kouta Minamizawa, Tokyo (JP); Katsunari Sato, Nara (JP)

(73) Assignee: Nippon Mektron, Ltd., Minato-Ku (JP)

( * ) Notice: Subject to any disclaimer, the term of this patent is extended or adjusted under 35 U.S.C. 154(b) by 0 days.

(21) Appl. No.: 14/715,857

(22) Filed: May 19, 2015

(65) Prior Publication Data

US 2015/0339899 A1  Nov. 26, 2015

(30) Foreign Application Priority Data

May 21, 2014  (JP) ................. 2014-105577

(51) Int. Cl.
| | |
|---|---|
| *G08B 6/00* | (2006.01) |
| *G06F 3/01* | (2006.01) |
| *G06F 3/041* | (2006.01) |
| *G06F 3/045* | (2006.01) |

(52) U.S. Cl.
CPC ............. *G08B 6/00* (2013.01); *G06F 3/014* (2013.01); *G06F 3/016* (2013.01); *G06F 3/045* (2013.01); *G06F 3/0416* (2013.01); *G06F 2203/0331* (2013.01)

(58) Field of Classification Search
CPC ......... G08B 6/00; G06F 3/014; G06F 3/016; G06F 3/0416; G06F 3/045; G06F 2203/0331; G09B 21/003

See application file for complete search history.

(56) References Cited

U.S. PATENT DOCUMENTS

| | | | | |
|---|---|---|---|---|
| 4,926,879 | A * | 5/1990 | Sevrain ................. | G08B 6/00 340/407.1 |
| 2006/0254898 | A1 * | 11/2006 | O'Leary ................ | G06F 3/014 200/500 |
| 2009/0151478 | A1 * | 6/2009 | Shimomoto ........... | G01L 1/146 73/862.626 |
| 2010/0253648 | A1 * | 10/2010 | St. Pierre .............. | G06F 3/043 345/174 |

(Continued)

OTHER PUBLICATIONS

Hiroyuki Kajimoto, et al., "Electric Tactile Display Fitted on a Forehead," Proceedings of the 11th Annual Conference of the Virtual Reality Society of Japan, 2006, pp. 1-4.

*Primary Examiner* — An T Nguyen

(57) ABSTRACT

A tactile sense presentation device is provided which is simple in structure, and is able to give a real tactile sense to a human body by causing electrical stimulation to effectively act thereon, while holding original human tactile sense. The electric tactile sense presentation device includes an electrode substrate adapted to be worn on a human body so as to be in contact with a skin, and a multitude of electrodes formed on a contact surface of the electrode substrate for contact with the skin to present a tactile sense by means of electrical stimulation, wherein the electrode substrate is composed of a flexible circuit body which is flexible to enable a portion thereof in contact with a real object to flexibly deform so as to conform to deformation of the skin, and it is configured such that electrical stimulation by the electrodes is superimposed on the tactile sense of a human being, while maintaining the human tactile sense.

8 Claims, 8 Drawing Sheets

(56) References Cited

U.S. PATENT DOCUMENTS

2012/0310303 A1* 12/2012 Popovic ............ A61N 1/36014
607/48
2015/0257970 A1* 9/2015 Mucke ................ A61N 1/0476
601/21
2015/0321000 A1* 11/2015 Rosenbluth .......... A61N 1/0492
607/48
2016/0022981 A1* 1/2016 Wingeier ............. A61N 1/0476
607/139
2016/0025669 A1* 1/2016 Sun ........................ H01G 9/022
205/790.5

* cited by examiner

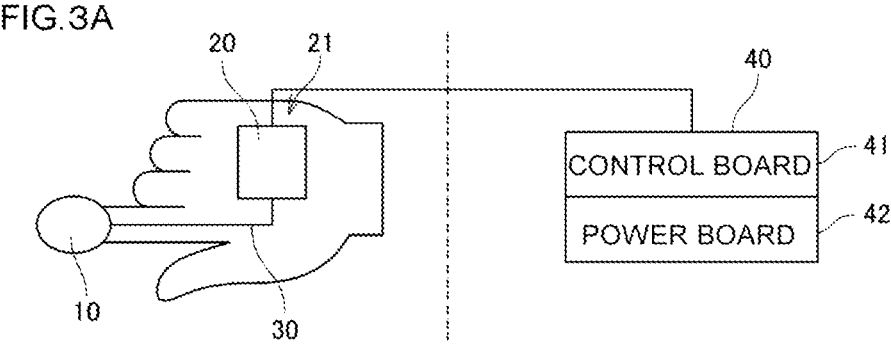
FIG.3A
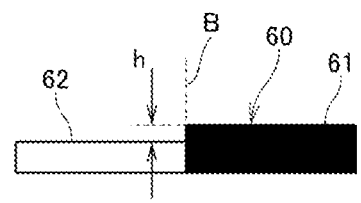
FIG.3D
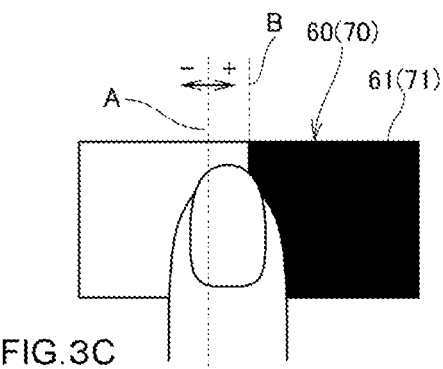
FIG.3B
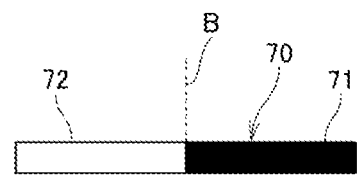
FIG.3E
FIG.3C

Just Noticeable Difference

ELECTRIC TACTILE SENSE PRESENTATION DEVICE

BACKGROUND OF THE INVENTION

1. Field of the Invention

The present invention relates to an electric tactile sense presentation device which can present arbitrary tactile senses by means of electrical stimulation, in cases where a real object is operated by a finger or hand.

2. Description of the Related Art

As this kind of conventional electric tactile sense presentation device, there has been known one such as described in a first non-patent literature, for example.

That is, an electric stimulator described in this non-patent literature simulates the activity of receptors at the time when a person touches an object by his or her finger or hand, and carries out tactile sense presentation by means of electrical stimulation, wherein the application thereof to work or operation support apparatuses which carry out remote operations and handling of dangerous objects is expected.

In order to give electrical stimulation to the finger and hand, it is necessary to directly attach a substrate board with electrodes mounted thereon to a skin of the person. As an example of such an electric stimulator, a hard substrate board has generally been used. For example, in the first non-patent literature, there are used a hard rigid substrate, a thick, hard electrode array, and so on.

PRIOR ART REFERENCES

Non-Patent Literature

First non-patent literature: Reference FIG. 4, by Hiroyuki Kajimoto, Yonezo Kanno, and Susumu Tachi, entitled "Electric Tactile Display fitted on a Forehead", Proceedings of the 11th Annual Conference of the Virtual Reality Society of Japan, pp 1-4, 2006

SUMMARY OF THE INVENTION

However, such an electric stimulator is attached to or worn on a finger, a hand, or a forehead of a person in a forced manner with the use of the hard rigid substrate, so it can not be pushed against the flexible finger, hand, or forehead in a uniform manner, but will be unevenly pushed against the skin, so that uneven electrical stimulation is given them from an initial state.

In addition, conventional attaching or mounting devices are hard and not light in weight, so a wearing feeling can not be eliminated, as a consequence of which the feeling given only by the electrical stimulation fades away, and the feeling to be originally obtained by the electrical stimulation has not been attained to a sufficient extent. Moreover, at the time when the person touches a real object, feeling information thereof such as hardness, shape, etc., has been obstructed.

The present invention has been made so as to solve the problems of the conventional technique as referred to above, and the object of the present invention is to provide a tactile sense presentation device which is simple in structure, and is able to give a real tactile sense to a human body by causing electrical stimulation to effectively act thereon, while maintaining original human tactile sense.

In order to achieve the above-mentioned object, the present invention resides in an electric tactile sense presentation device which includes an electrode substrate adapted to be worn so as to be in contact with a skin, and a multitude of electrodes formed on a contact surface of the electrode substrate for contact with the skin to present a tactile sense by means of electrical stimulation, wherein said electrode substrate is composed of a flexible circuit body which is flexible to enable a portion thereof in contact with a real object to flexibly deform so as to conform to deformation of the skin, whereby it is configured such that electrical stimulation by said electrodes is superimposed on the tactile sense of a human being, while maintaining the human tactile sense.

The electrical stimulation can be made by low frequency cathode and anode pulses. That is, the effect of the electrical stimulation can be increased by providing the application of anode voltage of a low frequency, while causing receptors of the skin to operate with the electrical stimulation by the application of cathode voltage.

If said flexible electrode substrate is formed with a slit for promoting deformation thereof, it is possible to enhance the flexibility of the electrode substrate to a more extent.

The location of attaching or wearing the electrode substrate can be, for example, a fingertip, a palm of a hand, etc.

In addition, a pressure distribution sensor may be combined with the electrode substrate so as to detect a contact portion of the electrode substrate which is in contact with the real object, thereby making it possible to selectively provide electrical stimulation from the electrodes of the contact portion detected by the pressure distribution sensor.

The pressure distribution sensor may also be arranged at a real object side of the electrode substrate separately therefrom, or can also be formed integrally with the electrode substrate.

Moreover, provision may be made for a cable unit that is drawn around from the electrode substrate, wherein said cable unit can be constructed such that it is formed with a zigzag-shaped expandable and contractible portion, as necessary.

Thus, for example, in cases where the cable unit is drawn around to a bent portion such as a finger or the like, undue or excessive stress will not be applied to the electrode substrate.

According to the present invention, the flexible circuit body is used as the electrode substrate, and hence, a feeling of wearing can be reduced as much as possible, so that the feel to be originally obtained by the electrical stimulation can be attained to a sufficient extent. In addition, upon touching the real object, the electrode substrate deforms flexibly with the deformation of the human skin, so that human tactile information such as hardness, shape, etc., can be obtained.

Moreover, because the electric tactile sense presentation device can be worn on a human body, the difference between the location with which the body is in contact and the location with which the body is not in contact can be made clear, thereby making it possible to provide more effective presentation of a tactile sense.

Further, because the electric tactile sense presentation device is of a wearable type, the receptors can be made to operate in advance by means of prior electrical stimulation, so it becomes possible to increase intended effects by giving a stimulus thereto. According to such a method, it is possible to extend a craftsman-like feel as well as sensitivity for inspection.

BRIEF DESCRIPTION OF THE DRAWINGS

FIGS. 1A through 1D show an electrode substrate of an electric tactile sense presentation device according to a first embodiment of the present invention, wherein FIG. 1A is a plan view of an electrode surface, FIG. 1B is a schematic cross sectional view of a layer structure of the electrode substrate, and FIGS. 1C and 1D are schematic views showing a non-contact state in which a finger is not in contact with a real object, and a contact state in which the finger is in contact with the real object, respectively.

FIG. 3A is a schematic view showing the overall construction of the electrode unit and a controller unit.

FIG. 3B and FIG. 3C are explanatory views for explaining texture superimposing experiments in which the electrode unit of FIG. 2A is used for a stepped surface.

FIG. 3D is a cross sectional view of a stepped surface plate used for the experiments.

FIG. 3E is a cross sectional view of a flat plate used for the experiments.

FIGS. 5A through 5C show an electrode substrate of an electric tactile sense presentation device according to a second embodiment of the present invention, wherein FIG. 5A is a plan view, FIG. 5B is a view showing a state in which the device is fitted or worn on a finger, and FIG. 5C is a perspective view showing the pad side of the finger in FIG. 5B.

DETAILED DESCRIPTION OF THE INVENTION

In the following, the present invention will be described in detail based on preferred embodiments thereof as illustrated.

However, the dimensions, materials, shapes, relative arrangements and so on of component parts described in the following embodiments are not intended to limit the scope of the present invention to these alone in particular as long as there are no specific statements.

First Embodiment

FIG. 1 and FIG. 2 show the schematic construction of an electric tactile sense presentation device according to a first embodiment of the present invention.

Figure 1A:
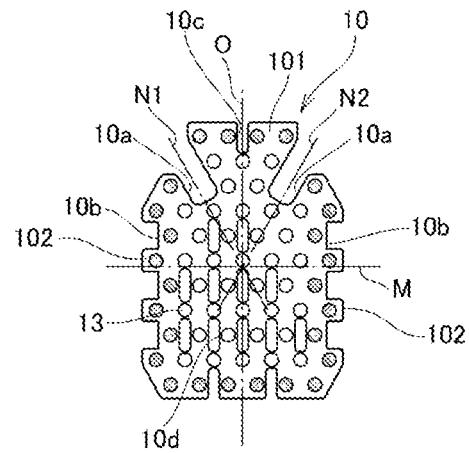
Figure 1B:
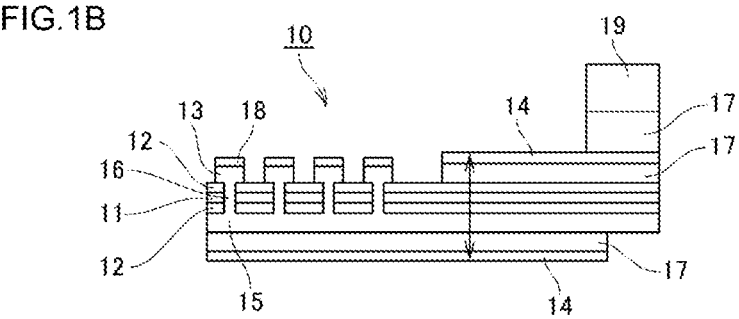
Figure 1C:
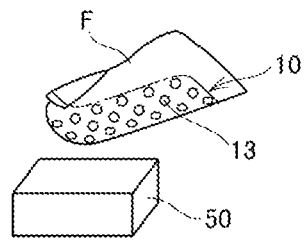
Figure 1D:
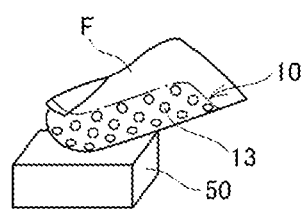

That is, this electric tactile sense presentation device 1 has an electrode substrate 10 fitted or worn on a human finger in such a manner that it is in contact with a human skin, as shown in FIGS. 1C and 1D, wherein the electrode substrate 10 is formed, on its surface adapted to be in contact with the skin, with a multitude of electrodes 13 for presenting a tactile sense by means of electrical stimulation. This electrode substrate 10 is composed of a flexible circuit body which is flexible to enable a portion thereof in contact with a real object to flexibly deform so as to conform to deformation of the skin, whereby it is configured so as to superimpose or overlap the electrical stimulation by the electrodes on the tactile sense of a human being, while maintaining the human tactile sense.

The electrode substrate 10 has a multitude of electrodes 13 which are formed on one side surface of a flexible base film 11, and wiring 15 for supplying electricity or electric current to the electrodes 13 is formed on the other side surface of the base film 11. The individual electrodes 13 are configured such that electrical signals are applied to them from the wiring 15 independently from one another.

In the illustrated example, the electrodes 13 and the wiring 15 are composed of copper foil which is bonded or stuck on the base film 11 through a base adhesive agent 12, and electrode patterns and wiring patterns are formed by means of etching. In addition, the electrodes 13 and the wiring 15 disposed on the back surface of the base film 11 are electrically connected to each other by means of interlayer connection portions 16 such as through-hole platings. Moreover, an electrode surface side of the electrode substrate 10 is covered with a cover film 14 through an adhesive agent 17, and a wiring side of the electrode substrate 10 is also covered with the cover film 14 through the adhesive agent 17. The electrodes 13 are not covered with the cover film 14. Further, the cover film 14 is reinforced with a reinforcement film 19 through the adhesive agent 17, as necessary. The electrodes 13 and the wiring 15 have exposed surfaces which are protected by means of plating 18.

In the illustrated example, as shown in FIG. 1B, a flexible printed circuit (FPC) has a double-sided structure, and is produced by bonding or pasting copper foil to the opposite side surfaces of the base film 11, patterning the copper foil on the opposite sides of the base film 11, and pasting the cover film 14 thereon.

For the base film 11 and the cover film 14, in general, there is used a polyimide film having a thickness of 25 μm, but a thickness of 12.5 μm or less is desirable for the purpose of bonding or pasting the polyimide film on a flexible curved surface such as a fingertip or a palm. In addition, for the copper foil, it is desirable to use one having a thickness of 18 μm or 12 μm, instead of a general thickness of 36 μm, and the thickness of the flexible printed circuit as a whole becomes about 128 μm.

In order to enhance the flexibility of the flexible printed circuit and the feeling of fitness to the fingertip to a more extent, there can be used, as materials for the base film 11 and the cover film 14, not only general polyimide but also flexible resin such as, for example, silicon, styrene, and urethane.

Here, note that the flexible printed circuit (FPC) can be of a single-sided structure in which copper foil is bonded or pasted to a polyimide film, and is then subjected to patterning, after which a cover film of polyimide is bonded or pasted on the copper foil. In that case, the electrodes 13 and the wiring 15 are patterned on the same surface.

For the base film 11 and the cover film 14, there can be used, not only the polyimide film, but also, for example, a single kind of film which is selected from, or a laminated film which is formed by laminating a plurality of resin films which are selected from, polyester, polyamide, polycarbonate, polyarylate, polyphenylene ether, poly phenylene sulphide, polyethersulfone, polyether imide, liquid crystal polymer, polyether ether ketone, cyclic polyolefin, polyamide imide, thermoplastic polyimide, polyethylene terephthalate, cycloolefin polymer.

The materials used for the base film 11 and the cover film 14 may be the same material, or different materials may be selected for them, respectively.

The adhesive agents are formed by using a well-known thermoplastic resin such as thermoplastic polyimide, or a well-known thermosetting resin such as cyanate ester based resin, polyphenylene ether based resin, phenol based resin, naphthalene resin, urea resin, amino resin, alkyd resin, silicon resin, furan resin, unsaturated polyester resin, epoxy resin, polyurethane resin, etc. Alternatively, the base adhesive agent 12 can also be formed of any of the above-mentioned organic resins with an inorganic filler such as silica, alumina or the like dispersed therein.

Next, the electric tactile sense presentation device 1 will be explained in more detail.

Figure 2A:
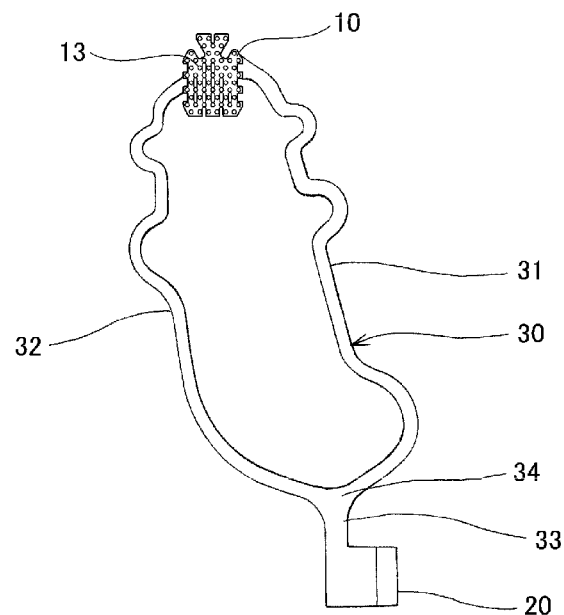
FIG. 2A is a view of an electrode unit which is provided with the electrode substrate of FIG. 1A.
Figure 2B:
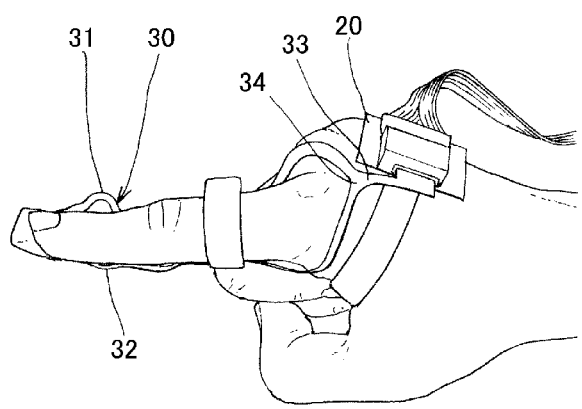
FIG. 2B is a view showing a state in which the electrode unit of FIG. 2A is fitted or worn on the finger.
Figure 2C:
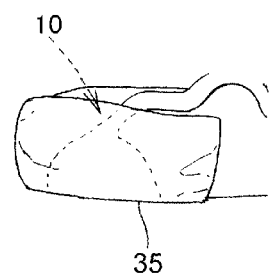
FIG. 2C is a view showing a state in which the electrode unit of FIG. 2A is fixed on the finger by means of a tape for fixation.

That is, this electric tactile sense presentation device 1 is provided with the electrode substrate 10 having the multitude of electrodes 13 for stimulating the skin, a switching terminal unit 20, and a cable unit 30 for connecting the electrode substrate 10 and the switching terminal unit 20 with each other, as shown in FIG. 2A. The electric tactile sense presentation device 1 is fitted or worn on an index finger, as shown in FIGS. 2B and 2C.

As the electrode substrate 10 is in the form of a substantially square shape to conform to the shape of the finger, as shown in FIG. 1A. A pair of upper corner slits 10a, 10a deeply cut obliquely toward a center line are formed at the right and left corners of a tip end or upper side of the square-shaped electrode substrate 10 located at the tip end side of the finger, and a plurality of side slits 10b, 10b are formed in the opposite right and left sides of the square-shaped electrode substrate 10.

An upper end protruding portion 101 is formed on the upper end of the electrode substrate 10 in a region which is sandwiched by a pair of the upper corner slits 10a, 10a. A pair of side protruding portions 102 formed between the upper corner slits 10a, 10a and the side slits 10b, 10b at the right and left sides, respectively, and side protruding portions 102 formed between the side slits 10b and the lower end side of the electrode substrate 10 protrude partially from a central area of the electrode substrate 10. The upper end protruding portion 101 is formed at its tip end with a slit 10c which further divides the upper end protruding portion 101 into a right portion and a left top portion.

In addition, a plurality of elongated holes 10d extending through the electrode substrate 10 are also formed in the central area of the electrode substrate 10, in order to improve flexibility thereof. By the provision of these elongated holes 10d, the contact surface of the electrode substrate 10 is made easy to follow the three-dimensional shape of a finger and to deform in a three-dimensional manner.

The electrodes 13 are disposed in a matrix form at intersections of a plurality of horizontal or transverse lines M drawn at predetermined intervals in parallel with one another in a direction orthogonal with respect to a vertical centerline O, a plurality of first vertical or oblique lines N1 drawn at predetermined intervals in parallel with one another in a direction tilted to the right at an angle of 30 degrees, and a plurality of second vertical or oblique lines N2 drawn at predetermined intervals in parallel with one another in a direction tilted to the left at an angle of 30 degrees.

With respect to the pattern of disposition of these electrodes 13, when assuming that four electrodes 13, which are located at four vertexes of a rhombus formed by a pair of equilateral triangles disposed in reverse relation to each other, are treated as a unit pattern, the elongated holes 10d are each formed along the vertical axis direction of each rhombus of the unit pattern.

In this example, the diameter d of each electrodes 13 is sets to 1 mm, and the interdistance a between adjacent electrodes is set to 2 mm. The number of electrodes used for stimulation is 37, and the number of electrodes used for GND is 26.

The cable unit 30 is also composed of FPC, and in this example, it is bifurcated from a connection portion 33 connected with the switching terminal unit 20 into a first cable portion 31 and a second cable portion 32, which are connected to the right and left side portions of the electrode substrate 10.

The switching terminal unit 20 is disposed at the back side of a hand, and the first cable portion 31 and the second cable portion 32 of the cable unit 30 extend from the right and left sides of the electrode substrate 10 fitted to the pad of the finger, while passing the opposite sides of the finger, so that they are connected to a branch portion 34 at the back side of the hand in the vicinity of the root of the finger. In addition, the cable unit 30 is formed at an intermediate portion with a partially curved portion, as appropriate, so as to permit the adjustment of the length thereof.

When the electrode substrate 10 is fitted or worn to the finger, it is necessary to make the electrode substrate 10 in intimate contact with the finger, and the electrode substrate 10 is fixedly secured to the finger by means of a fixing tape 35, as shown in FIG. 2C.

In use, the switching terminal unit 20 is connected to a switching board 21 which is connected to a control unit 40 provided with a control board 41 and a power board 42, as shown in FIG. 3A, so that an electrical signal is inputted to the unit 40 through the switching terminal unit 20 and the switching board 21 according to tactile sense stimulation. Signals for presenting tactile senses are various, but in the present invention, a low frequency anode-cathode pulse is provided.

In the case of use, as shown in FIGS. 1C and 1D in a simplified manner, the electrode substrate 10 is used by being made in contact with a real object 50. Because the electrode substrate 10 has a thin and flexible structure, the user or wearer can know the real contact with the real object 50 as well as how much intensity (or the extent of the contact pressure) the contact is made, by means of his or her own tactile sense through the electrode substrate 10.

In this state, an electrical stimulation for shape recognition is applied to each of the electrodes 13. The feel of the place of the finger which is in contact with the real object 50 is made to change by electrical stimulation, and to feed back to a human body, by giving individual separate tactile senses to those portions of the finger or hand which are in contact with the real object 50 and those portions thereof which are not in contact therewith, by means of the electrical stimulation.

Figure 8:
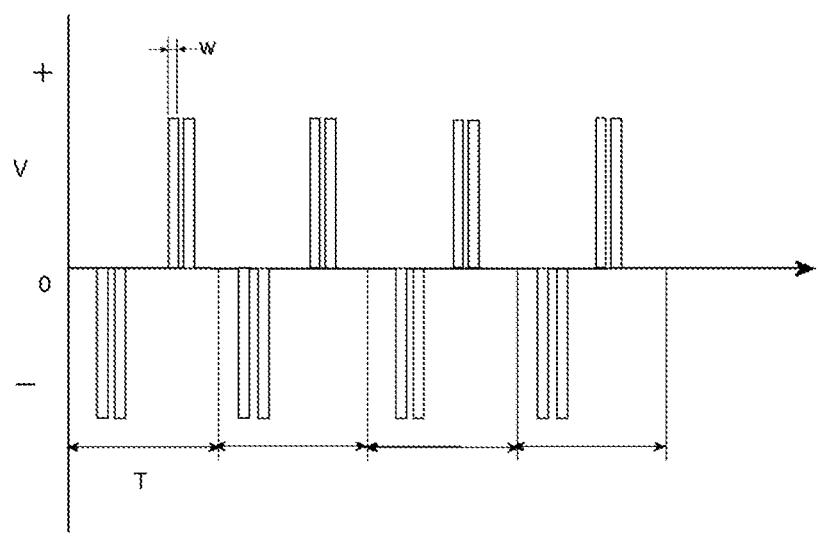
FIG. 8 is a view showing one example of a low frequency cathode and anode pulses according to the present invention.

Specifically, by providing an appropriate low frequency anode-cathode pulse, in a state where good contact and an effective stimulus area are secured for the electrodes 13 which give electrical stimulation, arbitrary tactile senses are presented by means of electrical stimulation. For example, it is possible to provide an effective stimulus, by setting the pulse width (w) of positive and negative voltage pulses to 30-60 μsec, the voltage (V) thereof to 40-300 V, and the electric current thereof to 1-10 mA, as shown in FIG. 8. Also, it is desirable to set a maximum value of the voltage and a maximum value of the electric current to 250 V and 5 mA, respectively. At a repetition frequency (1/T) of 1-200 Hz, it is possible to provide an effective stimulus, but a repetition frequency of 100 Hz or less is desirable.

With respect to the area of the skin to which effective electrical stimulation is given, it is desirable to be as large as possible, and it is also desirable that the number of electrodes existing in that skin area be as large as possible, but assuming that the electrode substrate 10 is applied to the tip area of the finger, the area of the skin or the area of substrate 10 need to be 10 mm$^2$ at minimum. In addition, it is desirable to decide the number of the electrodes in such a manner that the interval or pitch between mutually adjacent electrodes is equal to or less than 2 mm.

Thus, by using, as the electrode substrate 10, the FPC which is thin, light in weight and flexible, attachability or wearability of the electrode substrate 10 to the finger or hand becomes well, wearing feeling thereof also becomes comfortable, and the electrodes 13 can be made in intimate contact with the skin.

By providing positive and negative voltage pulses of low frequency to the fingertip or hand, with the use of the electrode substrate 10 adopting the FPC, which is excellent in attachability or wearability in this manner, it becomes possible to give a feeling which has been difficult to afford by means of electrical stimulation in the past. That is, the effect of the electrical stimulation can be increased by providing the application of low frequency pulses to the anode, while causing receptors of the skin to operate with the electrical stimulation by the application of cathode voltage, as a result of which it becomes possible to present a click feeling which has been impossible in the past.

Test Example 1

This test example shows the qualitative evaluation test result of human tactile feeling with respect to the frequency of electrical stimulation.
Test Method:
Test Subjects: three women at the age of twenties who had not used an electric stimulator until this time.

The electrodes were fitted on worn on a finger of each subject, and when the finger touched four regions A-D displayed on a touch panel, the finger was subjected to electrical stimuli of different frequencies (i.e., 100 Hz, 33 Hz, 10 Hz, 1 Hz) for the regions A-D, respectively. How to touch the regions, the period of time to touch, and the number of touches were not set but free.

The subjects were asked to enter their feeling for each stimulus into a questionnaire by using as many adjective or descriptive words as possible.

The subjects themselves were asked to adjust the intensity of a stimulus within a range in which they were able to perceive the stimulus and did not feel a pain.
Results:
The impressions of the stimuli for each subject are shown in table 1.

In cases where the same opinion is obtained from two or more subjects, it is shown by bold letters. In addition, the intensities of the stimuli as set are described in table 2.

In cases where the frequency of a stimulus is relatively high, there is a tendency that a tingling feeling or a prickling feeing, which occurs in the case of electric hand stimulation, is easily obtained.

When the stimulus frequency becomes low, there is a tendency that the feeling obtained approaches a pulsating feeling.

A subject 3, whose skin of the finger was thick, was hard to perceive electrical stimuli in comparison with the other subjects, and so, a set value of intensity was made higher.

In this manner, according to the present invention, it is understood that although there is variation in perception to the electrical stimuli according to the subjects, their tactile feelings, which are common with one another according to frequencies, can be obtained.

That is, in this test, electrical stimulation is applied to the individual electrodes 13 through the electrode substrate 10 of the thin flexible structure, in a state where each subject knows with what intensity the electrode substrate 10 is in contact with the real object by means of the tactile sense of her skin itself. Thus, this test shows that electrical stimulation can present the feel of a surface state such as, for example, an uneven (concavo-convex) feel, a coarse feel, a fine feel, etc., while superimposing the surface state feel on the cutaneous sensation of a contact state. In addition, it is also shown that a pulsating feeling can present a click feeling. In a conventional hard substrate, the state of contact thereof with a real object is unknown, and cutaneous sensation is premised or based on the state of contact of a human skin with a hard substrate, and hence, it is difficult to present a surface state in a fine manner.

TABLE 1

Sensation of Subjects aroused by Stimuli of Different Frequencies

| Stimulus | Subject | Tactile feel |
| --- | --- | --- |
| A (100 Hz) | 1 | fine, tingling, dry, flat, slimy, prickling |
|  | 2 | prickling, tingling, dull, painful, numb, itchy, creepy |
|  | 3 | prickling, rugged, |
| B (33 Hz) | 1 | rugged, coarse, scratchy, prickling |
|  | 2 | prickling, shaky |
|  | 3 | rugged, rough |
| C (10 Hz) | 1 | nubby, scratchy |
|  | 2 | tingling, glug-glug |
|  | 3 | rustling, crawling |
| D (1 Hz) | 1 | nubby, pulsating-like |
|  | 2 | pulsating-like, electrostatic-like |
|  | 3 | prickling, creepy |

TABLE 2

Intensities of Stimuli

| Subject | Pulse Width | Pulse Height (Intensity of Stimulus) |
| --- | --- | --- |
| 1 | 40 μs | around 60 V (1.2 mA) |
| 2 | 40 μs | around 80 V (1.6 mA) |
| 3 | 50 μs | around 210 V (4.2 mA) |

Test Example 2

FIGS. 3B through 3E show a test example 2.

A test made in this example was a texture (tactile feeling) superimposing experiment in which a texture was superimposed on a stepped surface, and it was tested whether a boundary A of texture presentation by electrical stimulation and an edge B of the stepped surface were able to be perceived.

The test environment is as follows.
Test Subjects: five men and women at the age of twenties and thirties
Finger Position Measurement
Using PHANTOM Premium (made by Sensable Inc.)
Height of Step: 0.5 mm
Test Condition
The boundary A of the texture presentation by electrical stimulation and the edge B perceived as a tactile sense were made to match with each other.
C1: Each subject touches, looking at a stepped surface plate 60.
C2: Each subject touches, without looking at the stepped surface plate 60.
C3: Each subject touches, looking at a flat plate 70.

The stepped surface plate 60 has a step h of 0.5 mm; a step upper surface 61 is black, and a step lower surface 62 is white; and the edge B is an actual boundary.

On the other hand, the flat plate 70 does not actually have any step, and a boundary B between a black first surface 71 (a virtual or imaginary step upper surface) and a white second surface 72 (a virtual or imaginary step lower surface) is formed on the same surface.

With respect to each of the above cases, electrical stimulation was applied to a contact region W, and points of subjective equality between the edge B and the boundary A of texture presentation were checked.

Figure 4A:
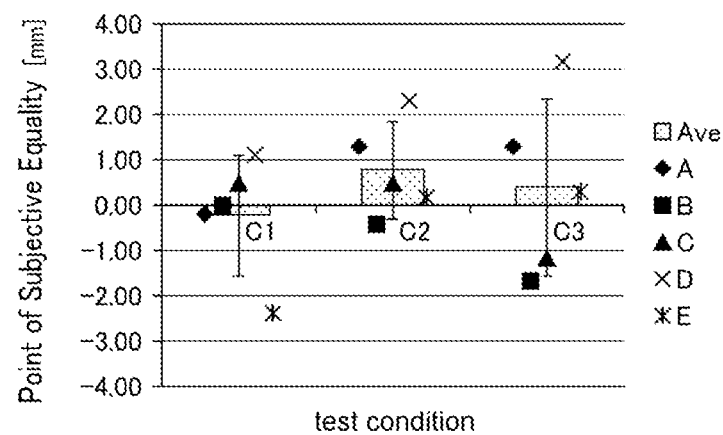
FIGS. 4A, 4B are graphs showing the experimental results of FIGS. 3A through 3E.
Figure 4B:
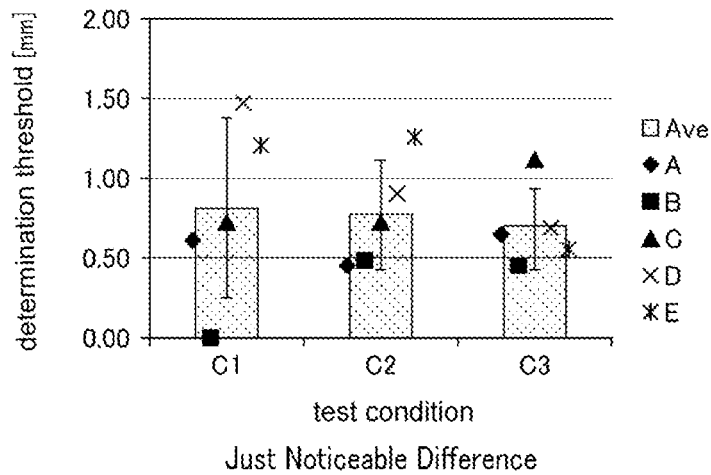

As a result of this test, the boundary A of the electrical stimulation and the accuracy of the perception of the actual edge B were equivalent, as shown in FIGS. 4A and 4B, and it was possible to superimpose the feel of texture on the real object, while having perceived the shape of the real object.

Second Embodiment

Figure 5A:
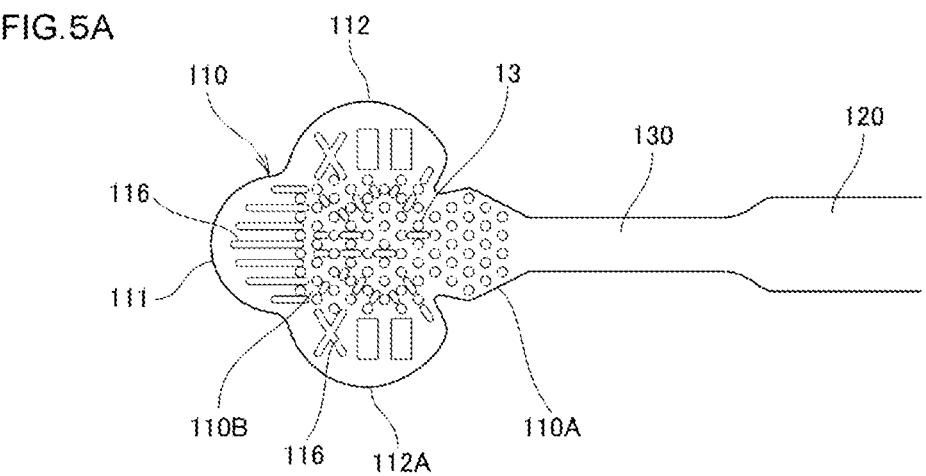
Figure 5B:
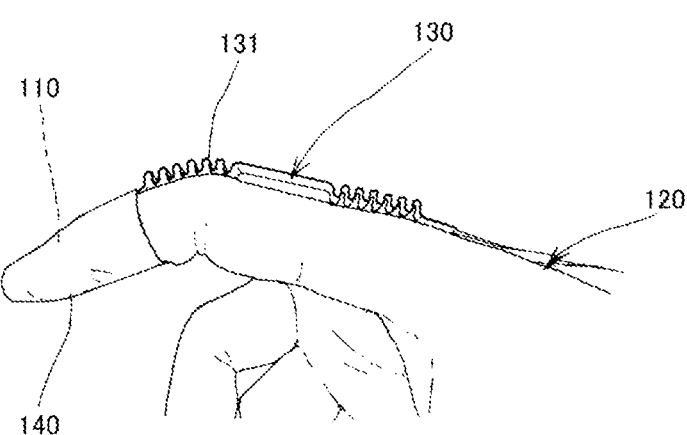
Figure 5C:
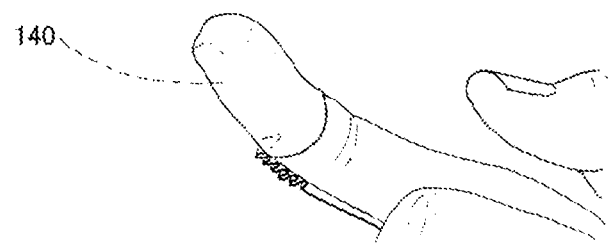

Next, an electric tactile sense presentation device according to a second embodiment of the present invention will be explained, while referring to FIG. 5.

In this example, an electrode substrate 110 is constructed such that it is made to turn around the fingertip of a finger from a pad side to a nail side thereof so as to form a U shape, with a cable unit 130 being turned to a back side of the finger so as to be connected to a connection terminal unit 120. The wearing or fitting state of the electrode substrate 110 is held by means of a finger stall or sack 140, as shown in FIG. 4B.

The electrode substrate 110 has a first region 110A for covering or wrapping the fingertip, and a second region 110B which continues to the first region 110A and is adapted to be in contact with the pad side of the finger tip. In addition, the cable unit 130 and the connection terminal unit 120 are molded integrally with each other.

The second region 110B of the electrode substrate 110 is of a quadrangular shape, and has a tip end protruding portion 111 formed at its tip end side thereof, and a pair of side protruding portions 112, 112 formed at right and left opposite sides thereof so as to extend in the shape of a petal. A plurality of slits 116 are formed in the tip end protruding portion 111 and the side protruding portions 112, 112, respectively.

A plurality of electrodes 13 are disposed on the electrode substrate 110 in the first region 110A and the second region 110B in a matrix form, with a plurality of slits being formed therein between adjacent electrodes 13 in order to improve flexibility, as in the case of the first embodiment.

In fitting on the finger, the cable unit 130 is drawn around from the back side of the finger, so that the second region 110B of the electrode substrate 110 is guided to cover or wrap the tip of the finger, and the first region 110A is made in contact with the pad of the finger. In order to hold this wearing state, the finger sack 140 is attached. In this example, the finger sack takes an appropriate shape suitable for the fingertip to touch an object.

The cable unit 130 thus drawn around has zigzag-shaped expandable and contractible portions 131 which are formed in a bellows shape, as appropriate, so that the change in the length thereof at the time of being bent can be adjusted. Thus, for example, in cases where the cable unit 130 is drawn or pulled around to a bent portion such as a finger or the like, undue or excessive stress will not be applied to the electrode substrate 110.

Here, note that the electrode substrate 110 of this second embodiment is composed of a flexible circuit body, as in the case of the electrode substrate 10 in the above-mentioned first embodiment, and in addition, the arrangement configuration of the electrodes 13 on the electrode substrate 110 is also the same as that of the first embodiment. Thus, the explanation of these is omitted.

Third Embodiment

Figure 6A:
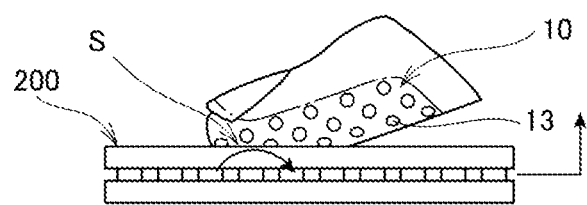
FIG. 6A is a view showing an electric tactile sense presentation device which is combined with a pressure distribution sensor, according to a third embodiment of the present invention.

FIG. 6A shows a third embodiment of the present invention.

In this third embodiment, an electrode substrate 10 for providing electrical stimulation and a pressure distribution sensor 200 are combined with each other. As the pressure distribution sensor 200, there is used one such as a detecting sheet, an electrostatic touch panel, etc., which is arranged separately from the electrode substrate 10.

By combining the electrode substrate 10 and the pressure distribution sensor 200 in this manner, a portion of the electrode substrate 10, being in contact with a real object, can be recognized by means of the pressure distribution sensor 200, so that arbitrary electrical stimulation can be selectively given to a detecting portion S of the pressure distribution sensor 200.

Fourth Embodiment

Figure 6B:
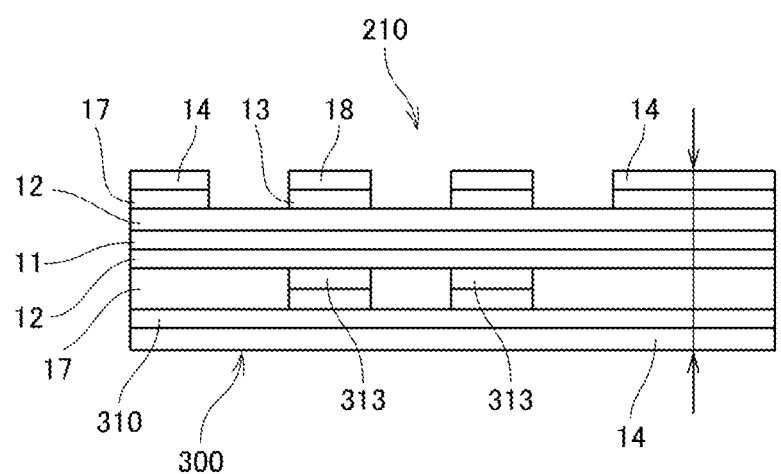
FIG. 6B is a view showing an electric tactile sense presentation device which is formed integrally with a pressure distribution sensor, according to a fourth embodiment of the present invention.

FIG. 6B shows a tactile sense presentation device according to a fourth embodiment.

In this embodiment, a pressure distribution sensor is integrally formed on the back surface of an electrode substrate 210, and in this figure, the layer structure of the electrode substrate 210 with the pressure distribution sensor is illustrated in a simplified manner.

The basic layer structure of the electrode substrate 210 in this fourth embodiment is the same as that of the electrode substrate 10 in the above-mentioned first embodiment, and hence, the same component parts as those of the first embodiment shown in FIGS. 1A through 1D are denoted by the same reference numerals and characters, and the explanation thereof is omitted.

In this embodiment, the electrode substrate 210 has a plurality of electrodes 13 for tactile sense presentation, which is formed at a contact surface side thereof adapted to be in contact with a finger, and a pressure detection portion 300 for pressure detection, which is formed at an object side surface thereof adapted to be in contact with an object, and which serves to detect contact pressure by making use of a change in contact resistance. That is, the pressure detection portion 300 is composed of a pressure-sensitive layer 310 which is formed on the object side surface of the electrode substrate 210, and the pressure-sensitive layer 310 is formed by coating, on the electrode substrate 210, a pressure-sensitive film of which electric resistance changes with pressure applied thereto. The pressure detection portion 300 has electrodes 313, 313 disposed between this pressure-sensitive layer 310 and a base film 11 of the electrode substrate 210, for detecting electric resistance changes in the pressure-sensitive layer 310. The pressure-sensitive layer 310 is coated with a cover film 14.

The pressure detection portion 300 uses one pair of electrodes 313, 313 as one electrodes unit, for detecting an electric resistance change of the pressure-sensitive layer 310 in contact with the pair of electrodes. By arranging a plurality of such electrodes units of the pressure detection portion 300 in a plurality of locations on the electrode substrate 210, a pressure distribution can be detected.

According to such a configuration, the pressure detection portion 300 can be integrally incorporated or built into the electrode substrate 210 with substantially the same thickness as a double-sided FPC, and hence, the flexibility of the electrode substrate 210 is not impaired.

As a pressure sensing portion, there can be used a cover film with a pressure-sensitive thin film deposited thereon. In this case, the pressure-sensitive thin film is composed of a material having a piezo-electric resistance effect in which an electric resistance value changes when deformed.

As a pressure application portion, there can be used such a material as copper oxide, copper sulfide, etc., which is combined with a plated conductor of the electrodes using copper wiring of the FPC, thereby forming a pressure sensor.

Fifth Embodiment

Figure 7A:
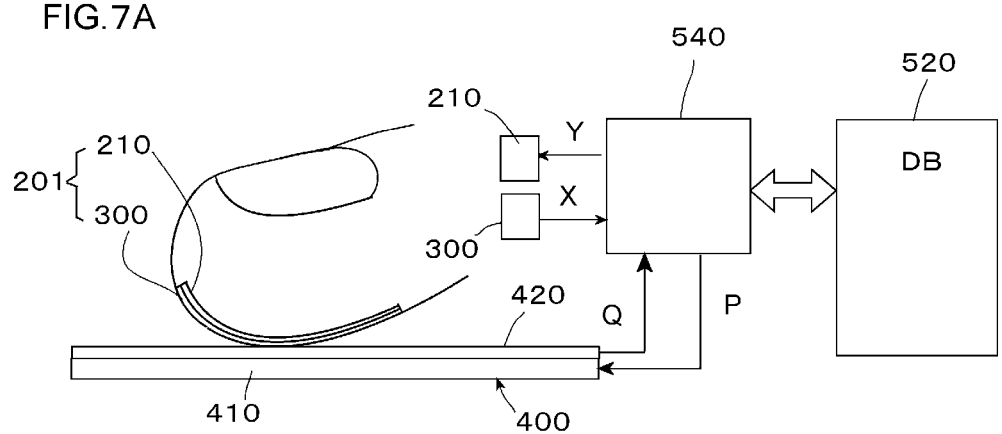
FIG. 7A is a view showing the schematic configuration of an electric tactile sense presentation system according to a fifth embodiment of the present invention in which the electric tactile sense presentation device formed integrally with the pressure distribution sensor according to the fourth embodiment of the present invention is further combined with a display which is provided with a touch panel.
Figure 7B:
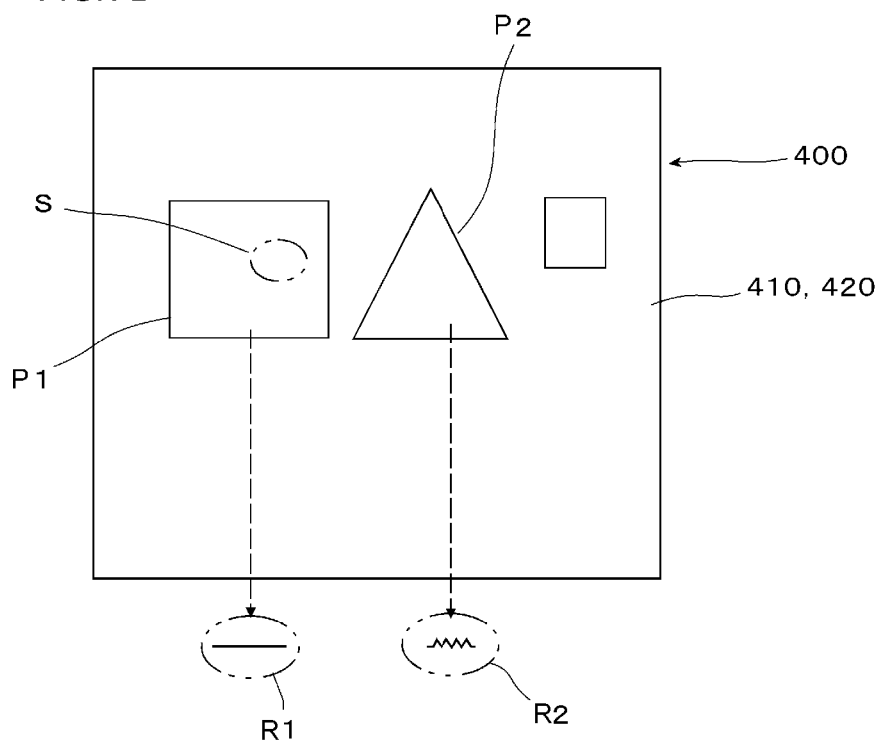
FIG. 7B is a view showing an example of an image shape displayed on the display in FIG. 7A.

FIG. 7 shows an electric tactile sense presentation device in which a presentation main device 501, which is formed by integrating the pressure detection portion 300 and the electrode substrate 210 according to the above-mentioned fourth embodiment with each other, is combined with a display which is provided with a touch panel.

That is, the electric tactile sense presentation device according to this fifth embodiment is constructed by comprising a display device 400 having a display 410 and a touch panel 420 formed on the display 410, the presentation main device 501 having the electrode substrate 210 and the pressure detection portion 300 formed integrally with each other, and a control unit 540 provided with a CPU for controlling the display device 400 and the presentation main device 501. The configuration of the presentation main device 501 is the same as the electrode substrate 210 and the pressure detection portion 300 of the above-mentioned fourth embodiment, and hence the explanation thereof is omitted.

The electrode substrate 210 and the pressure detection portion 300 of the presentation main device 501 are connected to the control unit 540, and in addition, the display 410 and the touch panel 420 of the display device 400 are also connected to the control unit 540. Moreover, the control unit 540 can make access to a database 520.

Shape images are outputted to and displayed on the display 410 according to an image signal of the control unit 540, and as for shape portions P to be displayed, information with respect to the tactile sense of each shape portion has been extracted in advance, and stored in the database 520. The information with respect to each shape is a surface property with respect to a tactile sense, which includes a variety of kinds of information such as, for example, whether it is a smooth shaped image, whether it is a rugged-shaped image, whether there is any step, etc.

In the illustrated example, as the shape portions M to be displayed, there are shown, by way of example, a quadrangular shape portion (P1), a triangular shape portion (P2), etc., wherein the surface property (R1) of the quadrangular shape portion (P2) is a smooth property, and the surface property (R2) of the triangular shape portion (P2) is a rugged property. These surface properties (R) have been stored in the database 520 together with the information on the shape portions (P). In addition, the coordinates positions of the shape portions (P) on the display 410 have also been stored in the database 520 in advance.

Next, the operation of the electric tactile sense presentation device according to this fifth embodiment will be explained.

First, picture images are displayed on the display 410 of the display device 400.

When a finger touches a shape image displayed on this display 410, the position information (Q) of this shape image is detected by the touch panel 420, and at the same time, the pressure applied to the finger upon touching is perceived by the pressure detection portion 300. This pressure detection portion 300 detects whether the finger touched with a strong force or a small force (soft touch), whether the finger touched with the tip end portion or the pad portion thereof, etc., and sends this detection information to the control unit 540 as tactile sensitivity information (X), together with the above-mentioned position information (Q) of the finger onto the touch panel 420.

In the control unit 540, a shape portion (P) which the finger is in contact with and its surface property (R) are determined from this position information (Q) of the finger, and in addition, an appropriate electrical stimulation signal (Y) is generated by carrying out calculation processing while taking into consideration the surface property (R) and the tactile sensitivity information (X), and then is fed back to the electrode substrate 210. By controlling in this manner, virtual contact sensation or feeling as if the finger touched the display image itself can be obtained.

In addition, with respect to the sense of pain and the sense of temperature which are cutaneous sensations, they have been stored as surface property information in the database 520 in advance, and by providing stimulation selectively, it becomes possible to create a feeling closer to reality. For example, they can be combined with stimulation information such as heat information with which one can feel hot when touching an image of flame, pain information with which one can feel a pain when touching an image of a sharp edged tool, etc.

Further the present invention can be applied to remote operation or control. For example, the invention can be combined with remote medical operation & medical care, and robots, whereby it can be applied to remote nuclear decommissioning operation, the maintenance operation of a remote space station, etc.

What is claimed is:

1. An electric tactile sense presentation device comprising:
    an electrode substrate with a contact surface adapted to be worn so as to be in contact with a skin; and
    a multitude of electrodes formed on the contact surface of said electrode substrate for contact with the skin to present a tactile sense by means of electrical stimulation;
    wherein said electrode substrate is composed of a flexible circuit body which is flexible to enable a portion thereof in contact with a real object to flexibly deform so as to conform to deformation of the skin, whereby it is configured such that the electrical stimulation by said electrodes is superimposed on the tactile sense of a human being, while maintaining the human tactile sense, wherein said electrode substrate is flexible and has a slit formed therein to promote deformation thereof, and wherein said electrodes are disposed on the contact surface of said electrode substrate such that in a plan view, four electrodes are located at four vertexes of a rhombus shape formed by two pair of equilateral triangles respectively disposed in reverse relation to each other so as to form a unit pattern of said electrodes, and said slit is formed in said electrode substrate along an axis direction between electrodes at opposed vertexes of one of the two pair of equilateral triangles in the rhombus shape of the unit pattern of said electrodes.

2. The electric tactile sense presentation device as set forth in claim 1, wherein said electrical stimulation is made by low frequency cathode and anode pulses.

3. The electric tactile sense presentation device as set forth in claim 1, wherein the location of wearing said electrode substrate is a fingertip.

4. The electric tactile sense presentation device as set forth in claim 1, wherein the location of wearing said electrode substrate is a palm of a hand.

5. The electric tactile sense presentation device as set forth in claim 1, further comprising:

a pressure distribution sensor that is combined with said electrode substrate so as to detect a contact portion of said electrode substrate which is in contact with the real object;

wherein electrical stimulation is selectively provided from electrodes in the contact portion detected by said pressure distribution sensor.

6. The electric tactile sense presentation device as set forth in claim 5, wherein said pressure distribution sensor is arranged at a real object side of said electrode substrate separately therefrom.

7. The electric tactile sense presentation device as set forth in claim 5, wherein said pressure distribution sensor is integrally formed with said electrode substrate.

8. The electric tactile sense presentation device as set forth in claim 1, further comprising:

a cable unit that is drawn around from said electrode substrate, and is provided with an expandable and contractible portion.

* * * * *